Patented July 18, 1939

2,166,133

UNITED STATES PATENT OFFICE 2,166,133

THERAPEUTICALLY VALUABLE GOLD COMPOUNDS AND A METHOD FOR PRODUCING THE SAME

Adolf Feldt, Berlin-Charlottenburg, Karl Schöllkopf, Berlin-Dahlem, and Adolf Schmitz, Berlin-Friedenau, Germany No Drawing. Application July 28, 1936, Serial No. 93,126. In Germany August 2, 1935

19 Claims. (Cl. 260—113)

This invention relates to therapeutically valuable gold compounds and more particularly to gold compounds of degradation products of keratinous compounds and a method for producing the same.

It is already known to produce albuminous degradation products that contain mercapto groups by subjecting keratinous substances to the hydrolysing action of acids whereby the reduction is carried out simultaneously with or successively after the hydrolysing treatment. These degradation products yield on reaction with gold compounds as is known to the art water soluble gold compounds that have found therapeutical application. On account of the reduction process necessary for making said degradation products, said process of manufacture is quite complicated. Furthermore the yield of valuable and effective substances is very low on account of a far-reaching degradation of the keratinous substances taking place due to reduction.

Now, it has been found that one may obtain therapeutically valuable water-soluble non-toxic complex metal compounds of degradation products of keratinous substances in a good yield by reacting the degradation products as obtained after acid hydrolysis directly with gold compounds, i. e., without reduction taking place, and neutralizing the reaction solution. Thereby hitherto unknown gold compounds are obtained. It is of advantage to neutralise the degradation solution after acid hydrolysis, for instance, after hydrolysis with hydrochloric acid, with ammonia or the like before reacting the same with suitable gold compounds.

The new gold compounds can be isolated from the reaction solution by transforming the same into their alkali metal salts and precipitating said alkali metal salts by the addition of suitable organic solvents, for instance, of alcohol and the like. They are slightly yellowish colored products, readily soluble in water and surpass the known gold keratinate compounds not only by their simple method of preparation but also by their better therapeutical activity.

The following examples serve to illustrate the invention without, however, limiting the same to them:

Example 1

100 grams of hair are heated with 400 grams of 18% hydrochloric acid in a water-bath until the entire keratinous substance is dissolved. Thereupon the hydrolysed solution is neutralised by the addition of concentrated ammonia and the not dissolved particles are removed by filtration.

A solution of auric chloride in water is gradually added to the neutral hydrolysed solution until the first formed precipitate no longer goes completely into solution; for a solution obtained from 100 grams of keratinous substance there are required about 4.5 to 5 grams of auric chloride. Thereby the solution becomes acid, is neutralised with sodium hydroxide solution and poured into 5 times its volume of a miscible, inert organic precipitant, such as alcohol, whereby the sodium gold keratinate formed precipitates in the form of conglomerating flakes. After allowing the precipitate to settle the alcoholic mother liquor is decanted. In order to purify the precipitate it is dissolved in water having a small addition of sodium hydroxide and is again precipitated by pouring into alcohol, preferably with addition of some sodium acetate solution. After twice repeating the said reprecipitating treatment the gold compound is obtained in the form of a pulverulent only slightly yellowish product. It contains about 6% of gold. The yield amounts to 20–25 grams of the gold compound from 100 grams of keratinous substances.

Example 2

100 grams of hair are decomposed with hydrochloric acid in the same manner as described in Example 1. The hydrolysed solution is neutralised with ammonia whereupon a solution of 7.5 grams of auric chloride in 50 cc. of water are gradually added. The precipitated gold keratinic acid is redissolved by neutralising the reaction solution with sodium hydroxide solution, so as to form the sodium salt of the gold keratinic acid. By pouring said solution into 5 times its volume of alcohol the gold compound is precipitated. It is purified by repeated dissolution in water and reprecipitation in alcohol. The yield amounts to 20 grams. The product contains about 13–14% of gold.

When adding still larger amounts of auric chloride to the solution formed on hydrolysis one may obtain gold keratinates that contain up to 33% of gold.

Instead of using hair as starting material other kinds of keratinous substances, for instance, wool, feathers and other horny tissue, such as horns, claws, nails, and the like may be used.

The hydrolysis may also be carried out with a hydrochloric acid of other concentration or even with other hydrolysing acids, for instance, sulphuric acid, phosphoric acid, hydrofluoric acid, etc.

An especially suitable degradation product of keratinous substances is obtained by subjecting said materials in the first step to a mild, but for complete dissolution insufficient hydrolytic or acidolytic treatment with acids and the like, whereby said treatment is interrupted when the starting materials are still water-insoluble but sufficiently transformed to be digestible by proteolytic enzymes. Thereafter the degradation product is subjected to the action of said proteolytic enzymes, so as to form a water-soluble keratinic compound. By the mild hydrolysis small amounts of water-soluble substances are also formed that can be separated from the water-insoluble products by washing. Duration of treatment, temperature limits and concentration during the acidolytic treatment are selected according to the strength of the acids or acid chlorides used. The optimal working conditions can be ascertained for any given starting material by preliminary experiments, whereby for control purposes digestibility tests may also be carried out. For this mild acidolytic treatment also organic acids may be used, such as formic acid, glacial acetic acid and also glacial acetic acid containing hydrogen halide. Among the acid chlorides thionyl chloride might, for example, be mentioned. The new products can also be obtained by treating said keratinous substances with gaseous hydrogen chloride in the presence of moisture at room-temperature. The speed of acidolytic action of hydrochloric acid is decisively influenced by the presence of small amounts of water. The smaller the amount of water present and the shorter the time the starting material is exposed to the action of the hydrogen chloride, the higher the yield of insoluble degradation products.

As enzymes suitable for enzymatic decomposition those belonging to the class of proteinases, for example, pepsin, papaine, kathepsin, may be employed. The use of pancreas extracts or trypsine-kinase is of special advantage.

Instead of using gold chloride other gold compounds may be used, such as auric oxide, hydrochloric aurichloride, aurous iodide, and the like.

Of course, also the other reaction conditions, the isolation, purification, and the like methods may be changed by those skilled in the art in accordance with the principles set forth herein and in the claims annexed hereto.

What we claim is:

1. A method for the production of gold compounds of degradation products of keratinous substances, comprising reacting an unreduced degradation product obtained by a hydrolytic treatment of keratinous substances, with an inorganic gold compound.

2. A method for the production of gold compounds of degradation products of keratinous substances, comprising reacting an unreduced degradation product obtained by an acid hydrolysis of keratinous substances, with an inorganic gold compound.

3. A method for the production of gold compounds of degradation products of keratinous substances, comprising subjecting a keratinous substance to a hydrolytic treatment, neutralising the hydrolysed solution and reacting the unreduced degradation product with an inorganic gold compound.

4. A method according to claim 3, wherein ammonia is used as neutralising agent.

5. A method according to claim 1, wherein after the addition of the gold compound the reaction solution is neutralised.

6. In a method according to claim 1 the step wherein the gold keratinate obtained on neutralising the reaction solution is precipitated by the addition of a miscible, inert organic precipitant.

7. In a method according to claim 1 the step wherein the gold keratinate obtained on neutralising the reaction solution is precipitated by the addition of alcohol.

8. In a method according to claim 1 the step wherein the degradation product obtained on mild hydrolytic treatment of keratinous substances is subsequently subjected to a proteolytic treatment.

9. In a method according to claim 1 the step wherein the degradation product obtained on mild hydrolytic treatment of keratinous substances is subsequently subjected to a treatment with proteolytic enzyms.

10. In a method according to claim 2 the step wherein the acid hydrolysis treatment is carried out with hydrochloric acid.

11. In a method according to claim 1 the step wherein as gold compound there is used an auric compound.

12. A method for the production of gold compounds of degradation products of keratinous substances, comprising reacting an unreduced degradation product obtained by a hydrolytic treatment of keratinous substances with auric chloride.

13. A gold keratinate as obtained by reacting an unreduced degradation product produced by a hydrolytic treatment of keratinous substances, with an inorganic gold compound, and neutralizing the reaction solution, said gold keratinate being soluble in water but insoluble in alcohol and having a slightly yellowish color.

14. A gold keratinate as obtained by reacting an unreduced degradation product produced by a hydrolytic treatment of keratinous substances, with an inorganic gold compound, and neutralizing the reaction solution, said gold keratinate being soluble in water but insoluble in alcohol, and containing from 6 to 33% of gold.

15. A method according to claim 1, wherein as starting material there is used a keratinous substance selected from a group of keratinous substances consisting of wool, hair, feathers, horn, claws and nails.

16. A method according to claim 1, wherein hair is used as starting material.

17. An alkali metal salt of a complex gold keratinic acid as obtained by reacting an unreduced degradation product produced by an acid hydrolysis of keratinous substances, an inorganic gold compound, and treating the formed gold keratinic acid with an alkali metal base, said complex gold keratinate being soluble in water but insoluble in alcohol.

18. A sodium salt of a complex gold keratinic acid as obtained by reacting an unreduced degradation product produced by an acid hydrolysis of keratinous substances, with an inorganic gold compound and neutralizing the formed gold keratinic acid with a basic compound of sodium, said complex gold keratinate being soluble in water but insoluble in alcohol.

19. A method for the production of gold compounds from degradation products of keratinous substances, comprising subjecting a keratinous substance to an acid hydrolysis, neutralising the hydrolysed solution and reacting the same, without previous reduction, with an inorganic gold compound.

ADOLF FELDT.
KARL SCHÖLLKOPF.
ADOLF SCHMITZ.